United States Patent
Heck et al.

(10) Patent No.: US 12,257,538 B2
(45) Date of Patent: Mar. 25, 2025

(54) AIR FILTER PRECLEANER

(71) Applicant: K&N Engineering, Inc., Riverside, CA (US)

(72) Inventors: Gilbert Heck, Nuevo, CA (US); Steve Williams, Cherry Valley, CA (US)

(73) Assignee: K&N Engineering, Inc., Riverside, CA (US)

( * ) Notice: Subject to any disclaimer, the term of this patent is extended or adjusted under 35 U.S.C. 154(b) by 0 days.

(21) Appl. No.: 18/227,191

(22) Filed: Jul. 27, 2023

(65) Prior Publication Data

US 2023/0364543 A1 Nov. 16, 2023

Related U.S. Application Data

(63) Continuation of application No. 17/183,207, filed on Feb. 23, 2021, now Pat. No. 11,724,226.
(Continued)

(51) Int. Cl.
*B01D 46/00* (2022.01)
*B01D 39/16* (2006.01)
*B01D 46/10* (2006.01)

(52) U.S. Cl.
CPC ..... *B01D 46/0005* (2013.01); *B01D 39/1676* (2013.01); *B01D 46/0001* (2013.01);
(Continued)

(58) Field of Classification Search
CPC ............... F02M 35/02; F02M 35/0201; F02M 35/02408; F02M 35/02416;
(Continued)

(56) References Cited

U.S. PATENT DOCUMENTS 5,368,621 A * 11/1994 Pool .................. B01D 46/60
55/498
2002/0124733 A1* 9/2002 Iriyama .............. F02M 35/0203
96/134
(Continued)

FOREIGN PATENT DOCUMENTS

CN 101652168 A * 2/2010 .......... B01D 39/163
CN 108854376 A * 11/2018
(Continued)

*Primary Examiner* — Hung Q Nguyen
(74) *Attorney, Agent, or Firm* — Rutan & Tucker LLP; Hani Z. Sayed

(57) ABSTRACT

An apparatus and methods are provided for an air filter precleaner for an open air filter box. The air filter precleaner includes a filter medium between a base and a grating that are fastened over an opening into an interior of the air filter box. The filter medium comprises a sheet of filter material having a shape and a size suitable for being supported between the base and the grating. The base is a rigid member that supports the filter medium in a sheet configuration, such that the airstream passes through the filter medium before entering the air filter box. The grating is a rigid member comprising a screen portion surrounded by a frame that is configured to be fastened onto the air filter box. The screen portion comprises a shaped lattice that allows the airstream to pass through the filter medium before entering the air filter box.

17 Claims, 10 Drawing Sheets

Related U.S. Application Data

(60) Provisional application No. 62/980,946, filed on Feb. 24, 2020.

(52) U.S. Cl.
CPC ......... *B01D 46/0012* (2013.01); *B01D 46/10* (2013.01); *B01D 2279/60* (2013.01)

(58) Field of Classification Search
CPC ....... F02M 35/02425; F02M 35/02466; F02M 35/02491; B01D 46/0005; B01D 39/1676; B01D 46/0001; B01D 46/0012; B01D 46/10; B01D 2279/60; B01D 46/521; B01D 2239/0478; B01D 2239/065; B01D 39/1615; B01D 46/62; B01D 46/645
See application file for complete search history.

(56) References Cited

U.S. PATENT DOCUMENTS

| | | | | |
|---|---|---|---|---|
| 2006/0283326 | A1* | 12/2006 | Oda | F02M 35/024 96/134 |
| 2007/0227108 | A1* | 10/2007 | Ishida | B01D 53/0415 55/521 |
| 2008/0034974 | A1* | 2/2008 | Uemura | F02M 35/024 96/136 |
| 2016/0052095 | A1* | 2/2016 | Simmons | B01D 46/645 29/281.5 |
| 2021/0115884 | A1* | 4/2021 | Ketterhagen | F02M 35/08 |

FOREIGN PATENT DOCUMENTS

| | | | | |
|---|---|---|---|---|
| WO | WO-2004007940 A1 * | 1/2004 | ......... | B01D 53/0415 |
| WO | WO-2010015319 A1 * | 2/2010 | ......... | B01D 46/0004 |

* cited by examiner

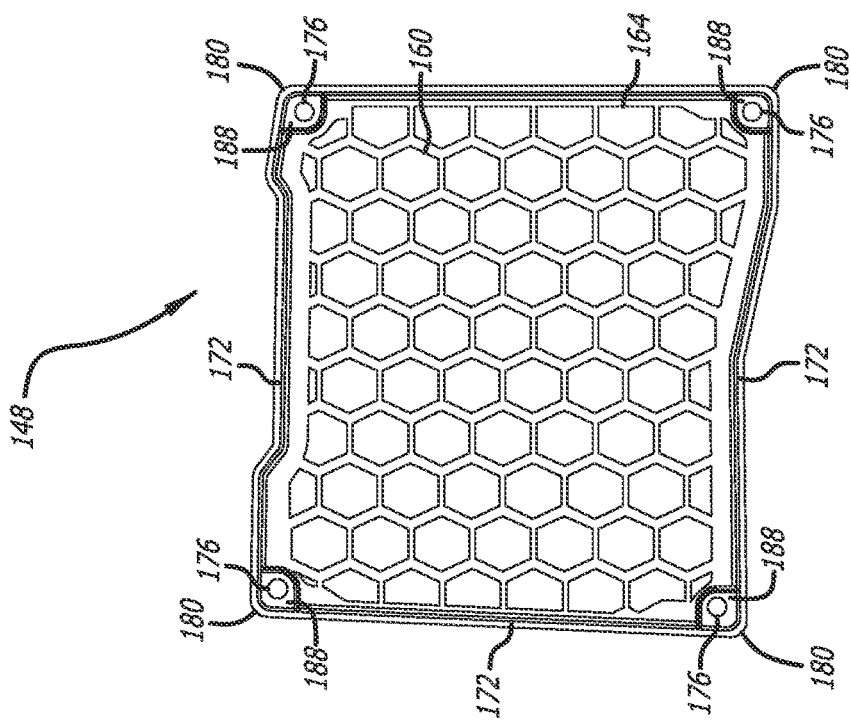
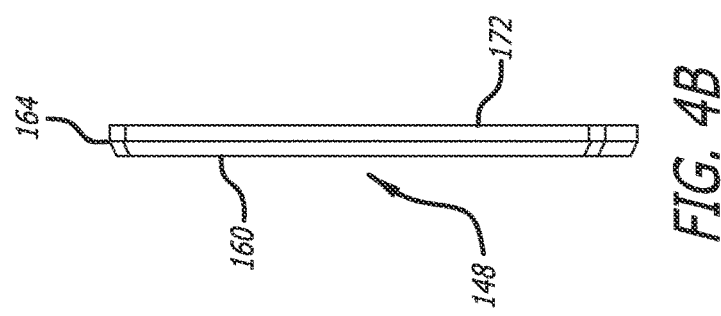
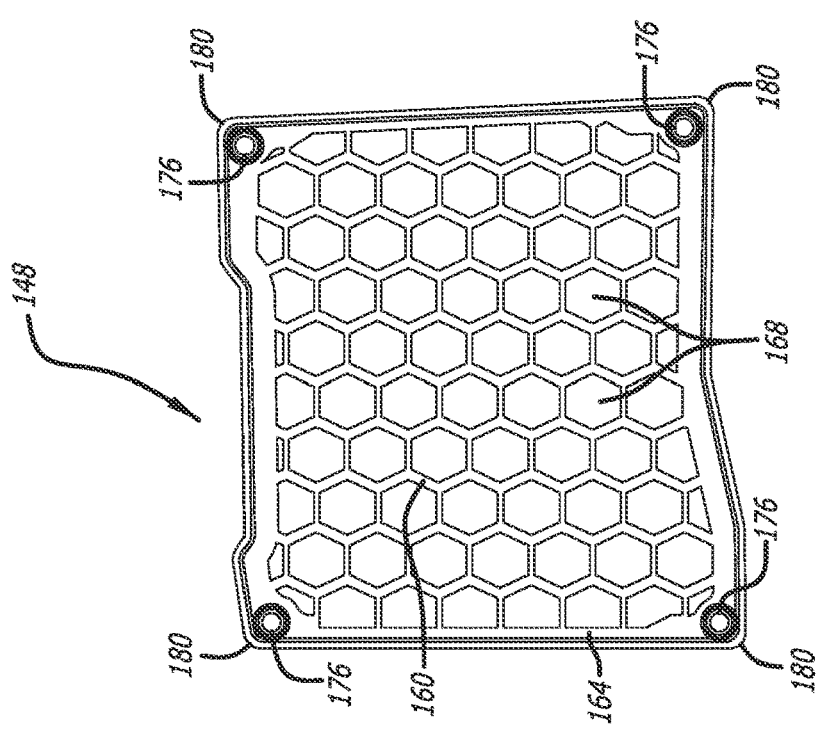

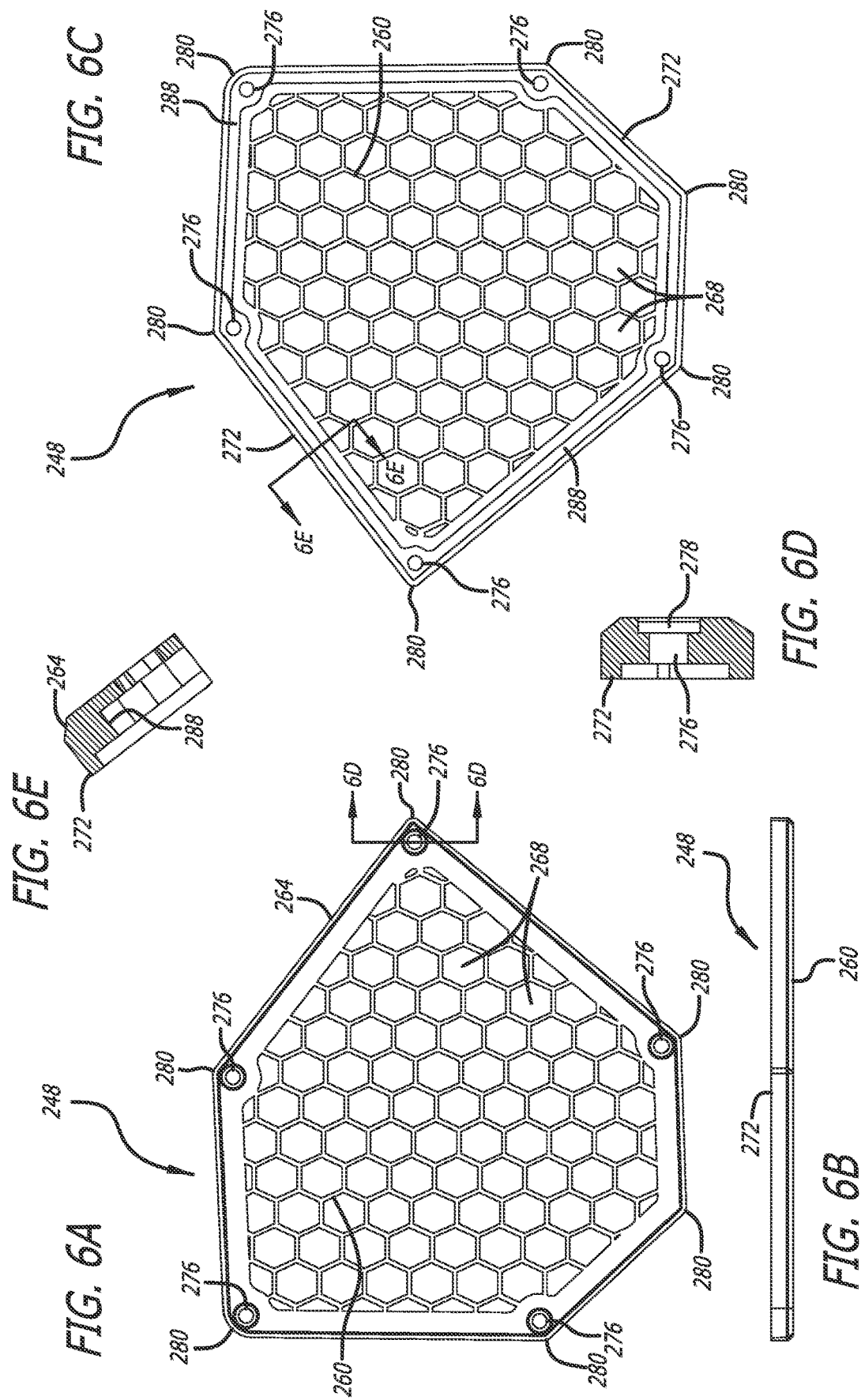

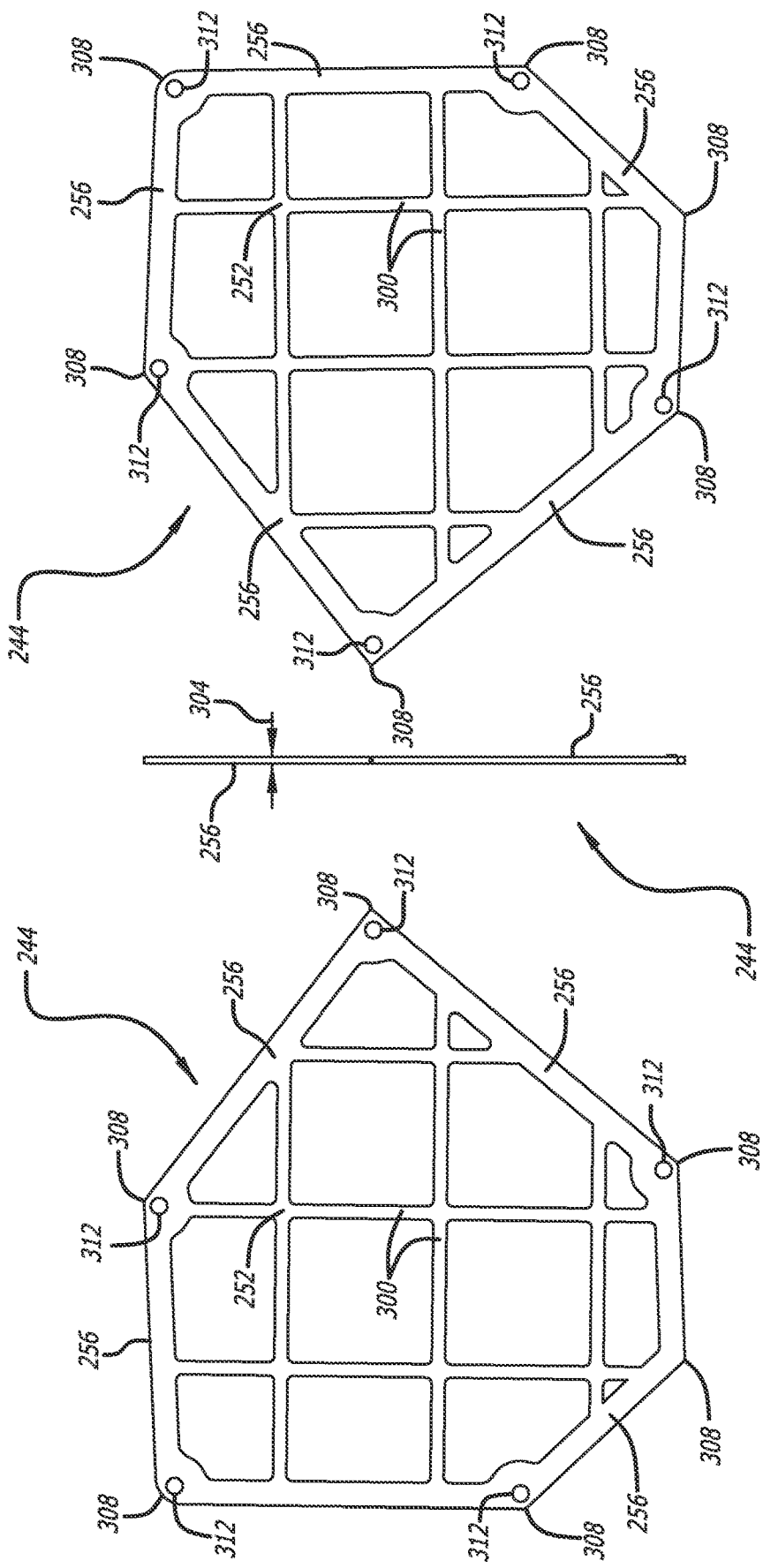

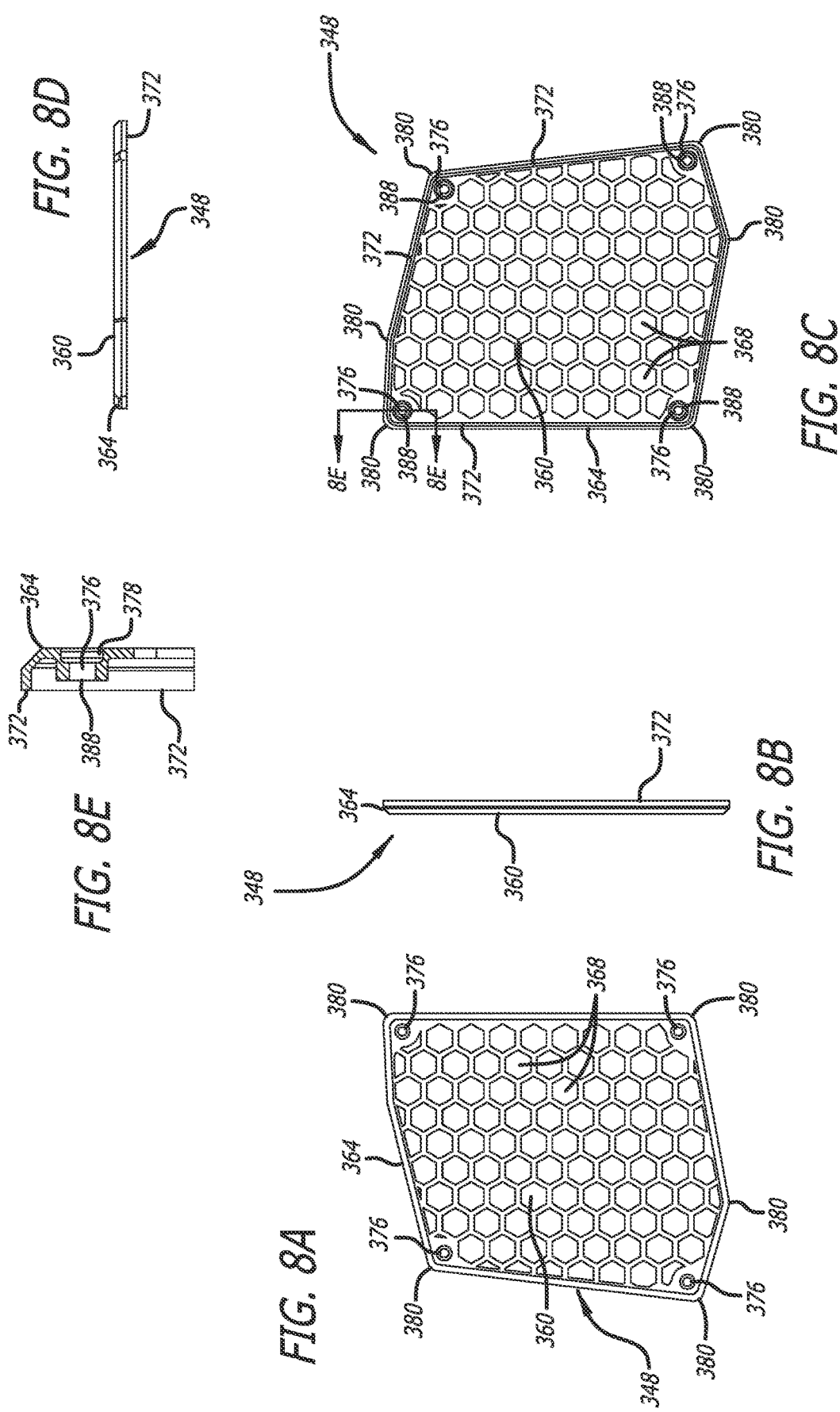

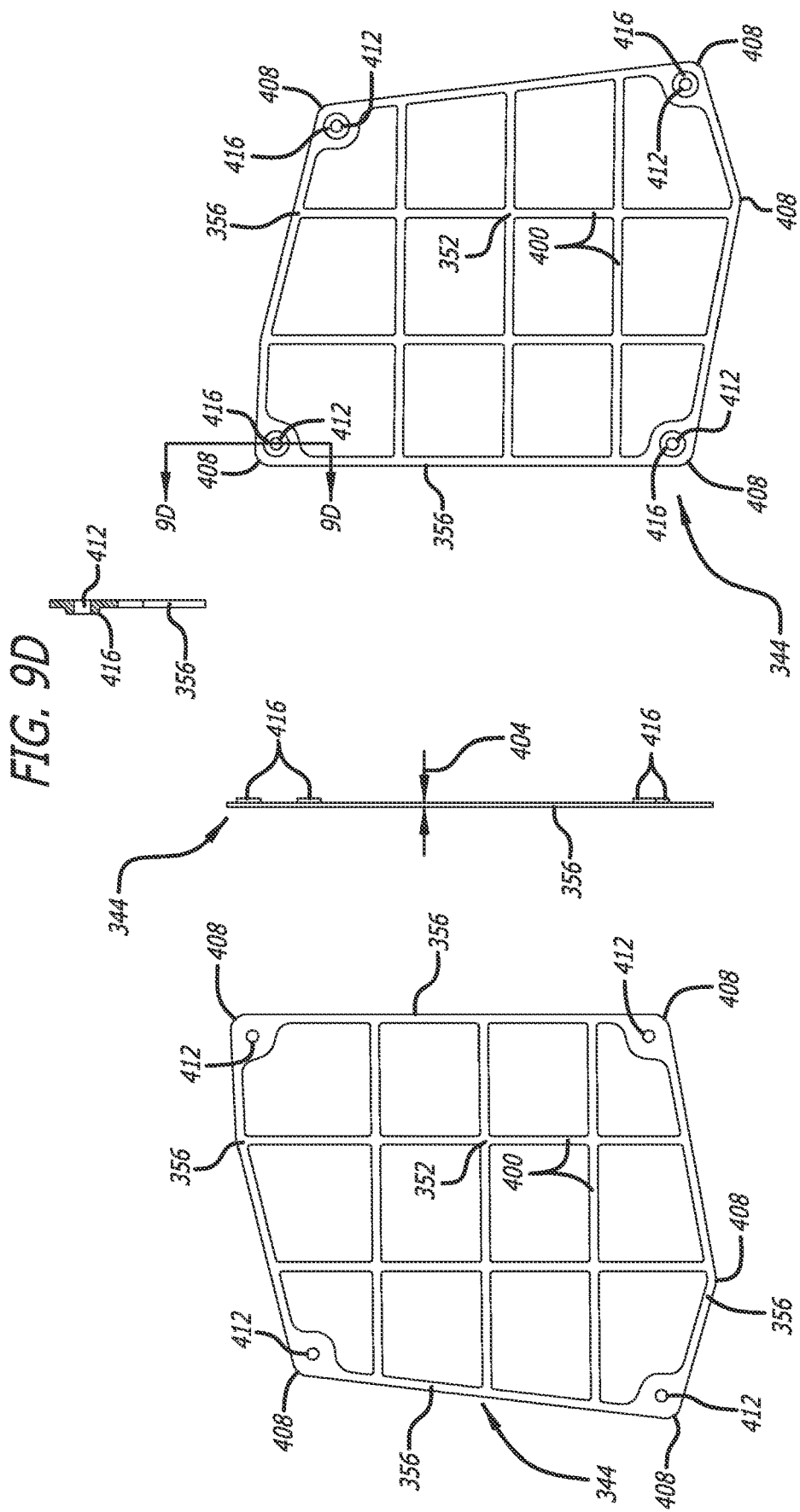

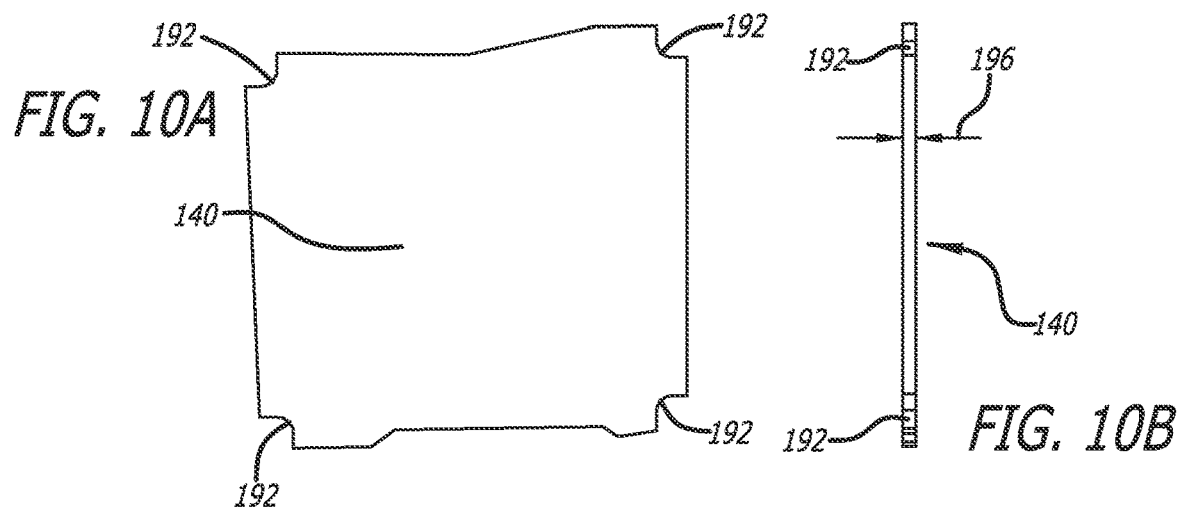
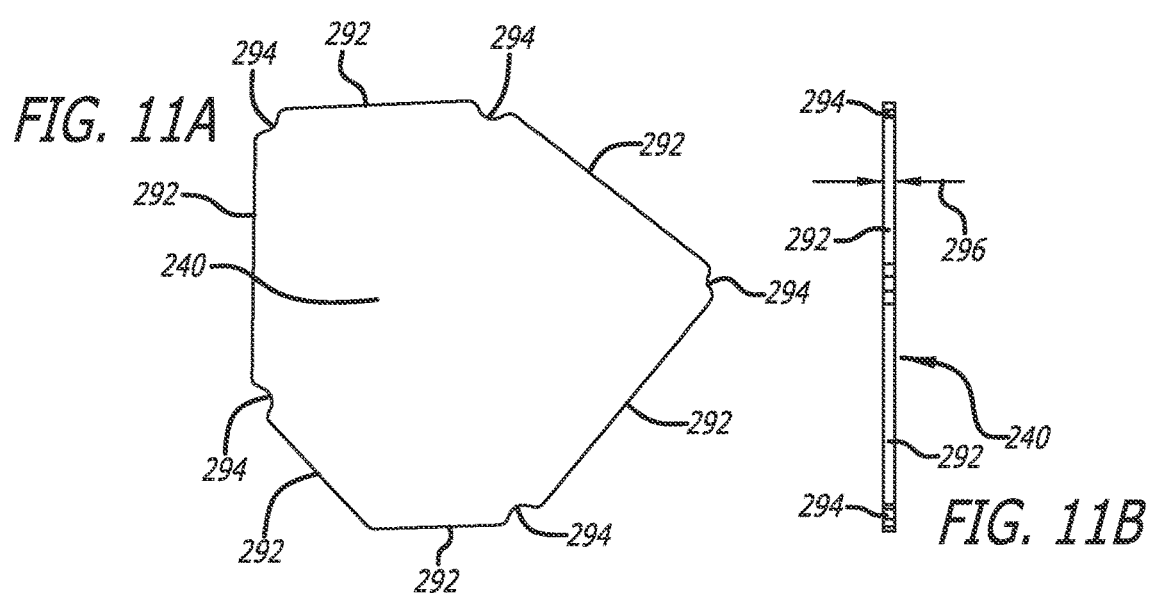
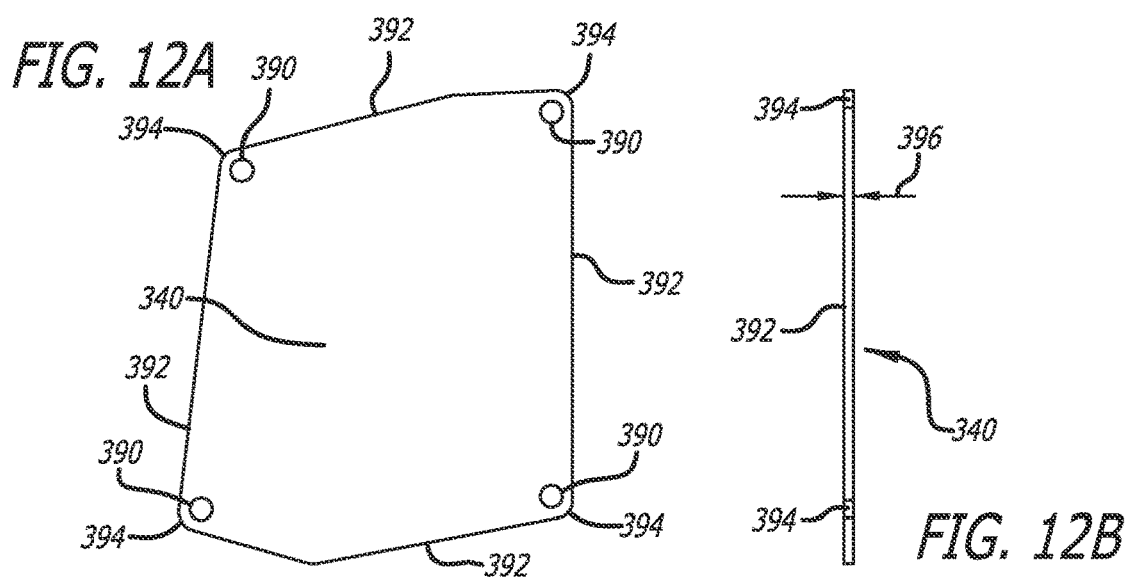

AIR FILTER PRECLEANER

PRIORITY

This application claims the benefit of and priority to U.S. patent application Ser. No. 17/183,207 filed on Feb. 23, 2021 and U.S. Provisional Application, entitled "Air Filter Precleaner," filed on Feb. 24, 2020 and having application Ser. No. 62/980,946, the entirety of said application being incorporated herein by reference.

FIELD

Embodiments of the present disclosure generally relate to the field of air filtration devices. More specifically, embodiments of the disclosure relate to an apparatus and methods for a precleaner for an air filter box.

BACKGROUND

An air filter designed to remove particulate is generally a device composed of fibrous materials. These fibrous materials may remove solid particulates such as dust, pollen, mold, and bacteria from the air. Air filters are used in applications where air quality is important, notably in building ventilation systems and in engines.

Air filters may be used in automobiles, trucks, tractors, locomotives and other vehicles that use internal combustion engines. Air filters may be used with gasoline engines, diesel engines, or other engines that run on fossil fuels or other combustible substances. Air filters may be used with engines in which combustion is intermittent, such as four-stroke and two-stroke piston engines, as well as other types of engines that take in air so that a combustible substance may be burned. For example, air filters may be used with some gas turbines. Filters may also be used with air compressors or in other devices that take in air.

Filters may be made from pleated paper, foam, cotton, spun fiberglass, or other known filter materials. Generally, the air intakes of internal combustion engines and compressors tend to use either: paper, foam, or cotton filters. Some filters use an oil bath. Air filters for internal combustion engines prevents abrasive particulate matter from entering the engine's cylinders, where it would cause mechanical wear and oil contamination. Many fuel injected engines utilize a flat panel pleated paper filter element. This filter is usually placed inside an enclosed, plastic box connected to a throttle body by way of ductwork. Vehicles that use carburetors or throttle body fuel injection systems typically use a cylindrical air filter positioned above the carburetor or the throttle body.

A drawback to enclosed air boxes that require flat panel paper filters is that as particulate matter builds up in the filter, air flow through the filter becomes restricted. Such a restricted air flow generally leads to a reduction in engine performance, such as a decrease in engine power output and a greater fuel consumption. Typically, paper air filters are removed from the vehicle and discarded, and a new paper air filter is then installed. Considering that there are millions of vehicles throughout the world, the volume of discarded air filters that could be eliminated from landfills is a staggering number. Another drawback to enclosed air boxes is that they typically conduct air through a tortuous path of hoses or ductwork before the air enters the intake of the engine. In some cases, the air box is a greater source of air restriction than is the paper filter. Similar to a contaminated air filter, a restrictive air box decreases engine performance and fuel economy.

One solution to the restricted air flow encountered with enclosed air boxes is utilize an open air filter box for filtering and conducting an airstream to an air intake of an engine. The open air filter box typically is coupled with an air filter comprising a filter medium configured to entrap particulates flowing within the airstream. The open air filter box may comprise one or more sidewalls and a mount wall configured to support the open air filter box within an engine bay. The open air filter box may be configured to be mounted, or fastened, onto the engine. An intake tube may be coupled with the air filter and configured to conduct the airstream to the air intake of the engine. The intake tube may be configured to be coupled with an air temperature sensor or a mass air sensor of the engine. An adapter typically is configured to couple the intake tube with the air intake.

Given that the open air filter box generally decreases air resistance to the air intake of the engine, there is a continuing interest in developing open air filter systems to improve engine performance beyond that otherwise possible with an enclosed air box.

SUMMARY

An apparatus and methods are provided for an air filter precleaner for an open air filter box. The air filter precleaner includes a filter medium disposed between a base and a grating that are fastened over an opening into an interior of the air filter box. The filter medium is configured for removing particulate matter from an airstream entering the air filter box through the opening. The filter medium comprises a sheet of filter material having a shape and a size suitable for being supported between the base and the grating. The base is a rigid member including a grate surrounded by a border portion that are configured to support the filter medium in a sheet configuration, such that the airstream passes through the filter medium before entering the air filter box. The grating is a rigid member comprising a screen portion surrounded by a frame that is configured to be fastened onto the air filter box. The grating includes a shape and a size suitable for fastening the base and the filter medium over the opening of the air filter box. The screen portion comprises a shaped lattice configured to allow the airstream to pass through the filter medium before entering the air filter box. In one embodiment, the shaped lattice comprises a multiplicity of hexagonal openings in the grating.

In an exemplary embodiment, an air filter precleaner for an air filter box comprises: a filter medium for removing particulate matter from an airstream entering the air filter box; a base for supporting the filter medium over an opening into an interior of the air filter box; and a grating for coupling the filter medium and the base to the air filter box.

In another exemplary embodiment, the filter medium comprises a sheet of filter material having a shape and a size suitable for being supported between the base and the grating. In another exemplary embodiment, the sheet of filter material includes a thickness suitable for being disposed within a space disposed between the grating and the base. In another exemplary embodiment, the sheet of filter material includes corner cutouts configured to allow one or more corner portions of the grating to contact a border portion of the base. In another exemplary embodiment, the sheet of filter material comprises a reticulated polyester urethane foam.

In another exemplary embodiment, the base includes a shape and a size suitable for being fastened over the opening of the air filter box. In another exemplary embodiment, the base is a rigid member comprising a grate surrounded by a border portion configured to be coupled with the air filter box. In another exemplary embodiment, the base is configured to support the filter medium in a sheet configuration such that the airstream passes through the filter medium before entering the air filter box. In another exemplary embodiment, the grate comprises a framework of perpendicularly disposed elongate members arranged to support the filter medium.

In another exemplary embodiment, the border portion is configured to be coupled with a mating surface surrounding the opening of the air filter box. In another exemplary embodiment, the border portion includes a shape and a size suitable for being coupled with the mating surface and extending over the opening. In another exemplary embodiment, the border portion includes a thickness suitable for being disposed between the grating and the mating surface. In another exemplary embodiment, the border portion includes a through-hole disposed in one or more corner portions, each of the through-holes being configured to allow passage of a hardware fastener into a hole disposed in the mating surface of the air filter box. In another exemplary embodiment, the hardware fastener is a threaded bolt.

In another exemplary embodiment, the grating includes a shape and a size suitable for being fastened over the opening of the air filter box. In another exemplary embodiment, the grating is a rigid member comprising a screen portion surrounded by a frame that is configured to be fastened onto the air filter box. In another exemplary embodiment, the screen portion comprises a shaped lattice configured to allow the airstream to pass through the filter medium before entering the air filter box. In another exemplary embodiment, the shaped lattice comprises a multiplicity of hexagonal openings in the grating.

In another exemplary embodiment, the frame includes a peripheral lip that is configured to extend over the filter medium and the base. In another exemplary embodiment, the peripheral lip is configured to contact a mating surface surrounding the opening of the air filter box. In another exemplary embodiment, the frame includes a through-hole disposed in one or more corner portions, each of the through-holes being configured to allow passage of a hardware fastener into a hole disposed in a mating surface surrounding the opening of the air filter box. In another exemplary embodiment, the through-hole is counterbored to allow the hardware fastener to be disposed below an exterior surface of the grating. In another exemplary embodiment, the hardware fastener is a threaded bolt. In another exemplary embodiment, the one or more corner portions include an interior surface configured to contact the base such that a space suitable for the filter medium is disposed between the base and the screen portion, the peripheral lip extending around the base.

In an exemplary embodiment, a method for an air filter precleaner for an air filter box comprises: configuring a base to support a filter medium over an opening into an interior of the air filter box; arranging the filter medium to remove particulate matter from an airstream entering the air filter box; and forming a grating to couple the filter medium and the base to the air filter box.

In another exemplary embodiment, configuring the base includes forming a shape and a size of the base suitable for being fastened over the opening of the air filter box. In another exemplary embodiment, configuring the base includes forming a grate surrounded by a border portion to be coupled with the air filter box. In another exemplary embodiment, forming the grate includes configuring the base to support the filter medium in a sheet configuration such that the airstream passes through the filter medium before entering the air filter box.

In another exemplary embodiment, arranging the filter medium includes forming a shape and a size of the filter medium suitable for being supported between the base and the grating. In another exemplary embodiment, forming the shape and the size includes configuring corner cutouts to allow one or more corner portions of the grating to contact a border portion of the base.

In another exemplary embodiment, forming the grating includes forming a shape and a size of the grating suitable for being fastened over the opening of the air filter box. In another exemplary embodiment, forming the grating includes configuring a screen portion surrounded by a frame that is configured to be fastened onto the air filter box. In another exemplary embodiment, configuring the screen portion includes forming hexagonal openings in the grating.

In an exemplary embodiment, a method for an air filter precleaner for an air filter box comprises: disposing a base over an opening into an interior of the air filter box; extending a filter medium onto the base so as to cover the opening; and fastening the base and the filter medium to the air filter box by way of a grating.

In another exemplary embodiment, disposing the base includes placing a border portion of the base in contact with a mating surface surrounding the opening of the air filter box. In another exemplary embodiment, placing includes aligning a through-hole disposed in each of one or more corner portions of the base with holes disposed in the mating surface. In another exemplary embodiment, extending includes laying the filter medium in a sheet configuration upon a grate comprising the base such that an inflowing airstream passes through the filter medium before entering the air filter box.

In another exemplary embodiment, fastening the base includes placing a frame of the grating onto the base, such that the filter medium is disposed in a sheet configuration between the base and a screen portion comprising the grating. In another exemplary embodiment, placing the frame includes aligning one or more corner portions of the grating with one or more corner portions of the base, such that through-holes in the grating are aligned with through-holes in the base and holes in a mating surface surrounding the opening of the air filter box. In another exemplary embodiment, fastening the base and the filter medium to the air filter box by way of the grating includes extending a hardware fastener into each of the through-holes and fixedly engaging the hardware fastener with the holes in the mating surface.

These and other features of the concepts provided herein may be better understood with reference to the drawings, description, and appended claims.

BRIEF DESCRIPTION OF THE DRAWINGS

The drawings refer to embodiments of the present disclosure in which:

FIG. 4A illustrates a top plan view of an exemplary embodiment of a grating comprising the air filter precleaner of FIG. 1;

FIG. 4B illustrates a side plan view of the grating shown in FIG. 4A;

FIG. 4C illustrates a bottom plan view of the grating shown in FIG. 4A;

FIG. 6A illustrates a top plan view of an exemplary embodiment of a grating comprising the air filter precleaner of FIG. 2;

FIG. 6B illustrates a side plan view of the grating shown in FIG. 6A;

FIG. 6C illustrates a bottom plan view of the grating shown in FIG. 6A;

FIG. 6D illustrates a cross-sectional view of a through-hole comprising the grating shown in FIG. 6A, taken along a line A-A;

FIG. 6E illustrates a cross-sectional view of a frame comprising the grating shown in FIG. 6C, taken along a line B-B;

FIG. 7A illustrates a top plan view of an exemplary embodiment of a base comprising the air filter precleaner of FIG. 2;

FIG. 7B illustrates a side plan view of the base shown in FIG. 7A;

FIG. 7C illustrates a bottom plan view of the base shown in FIG. 7A;

FIG. 8A illustrates a top plan view of an exemplary embodiment of a grating comprising the air filter precleaner of FIG. 3;

FIG. 8B illustrates a side plan view of the grating shown in FIG. 8A;

FIG. 8C illustrates a bottom plan view of the grating shown in FIG. 8A;

FIG. 8D illustrates a side plan view of the grating shown in FIG. 8A;

FIG. 8E illustrates a cross-sectional view of a frame comprising the grating shown in FIG. 8C, taken along a line A-A;

FIG. 9A illustrates a top plan view of an exemplary embodiment of a base comprising the air filter precleaner of FIG. 3;

FIG. 9B illustrates a side plan view of the base of FIG. 9A;

FIG. 9C illustrates a bottom plan view of the base of FIG. 9A;

FIG. 9D illustrates a cross-sectional view of a through-hole comprising the base of FIG. 9C, taken along a line A-A;

FIG. 10A illustrates a bottom plan view of an exemplary embodiment of a filter medium comprising the air filter precleaner shown in FIG. 1;

FIG. 10B illustrates a side plan view of the filter medium shown in FIG. 10A;

FIG. 11A illustrates a top plan view of an exemplary embodiment of a filter medium comprising the air filter precleaner shown in FIG. 2;

FIG. 11B illustrates a side plan view of the filter medium shown in FIG. 11A;

FIG. 12A illustrates a top plan view of an exemplary embodiment of a filter medium comprising the air filter precleaner shown in FIG. 3; and FIG. 12B illustrates a side plan view of the filter medium shown in FIG. 12A.

Figure 1:
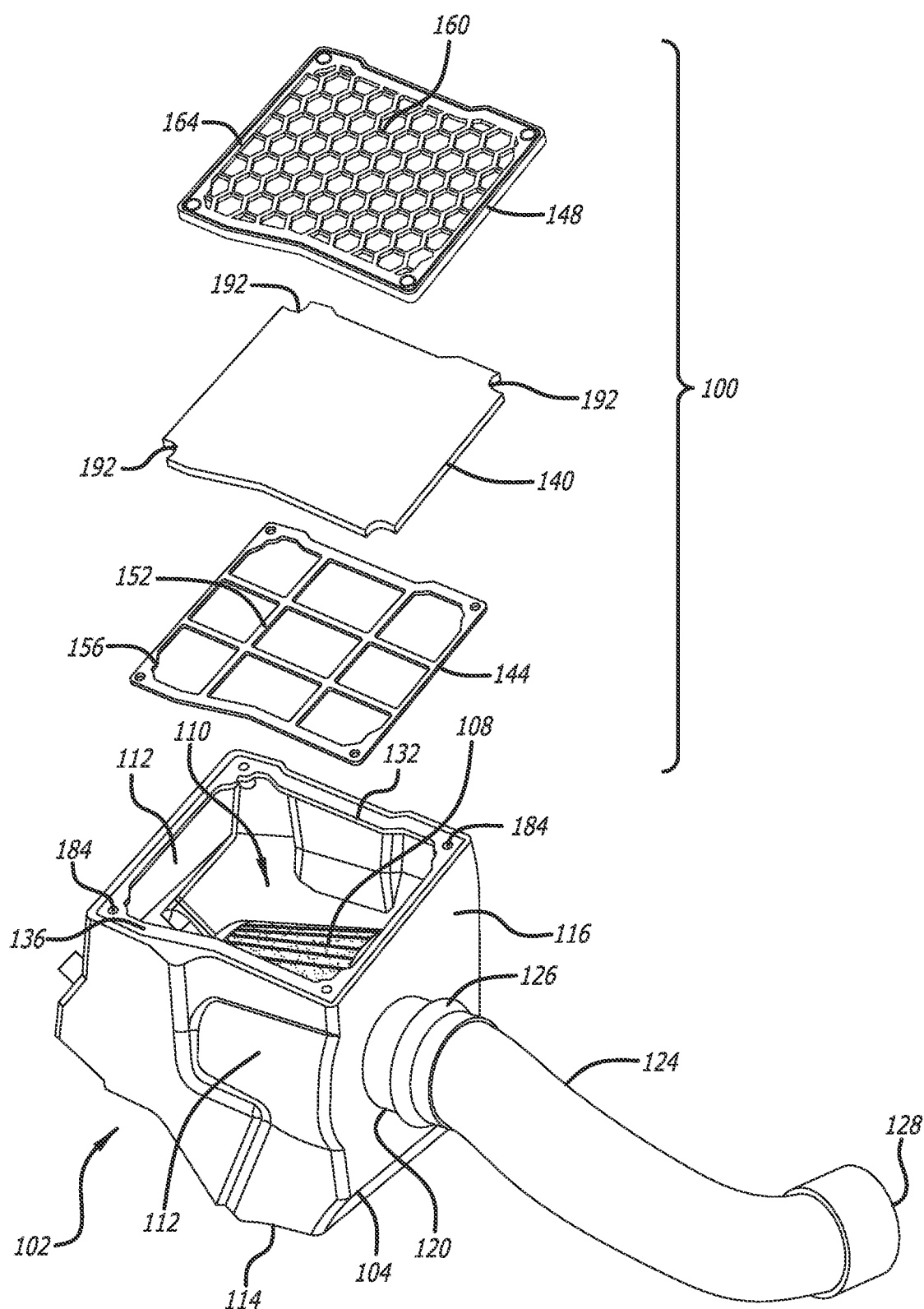
FIG. 1 illustrates an exploded isometric view of an exemplary embodiment of an air filter precleaner that is configured to be coupled with an exemplary embodiment of an aircharger air intake system.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first filter," may be made. However, the specific numeric reference should not be interpreted as a literal sequential order but rather interpreted that the "first filter" is different than a "second filter." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

A drawback to enclosed air boxes is that they typically conduct air through a tortuous path of hoses or ductwork before the air enters the intake of the engine. In some cases, the air box is a greater source of air restriction than is the paper filter. Similar to a contaminated air filter, a restrictive air box decreases engine performance and fuel economy. One solution to the restricted air flow encountered with enclosed air boxes is utilize an open air filter box for filtering and conducting an airstream to an air intake of an engine. The open air filter box typically is coupled with an air filter comprising a filter medium configured to entrap particulates flowing within the airstream. The open air filter box may be configured to be mounted, or fastened, onto the engine. An intake tube may be coupled with the air filter and configured to conduct the airstream to the air intake of the engine. Given that the open air filter box generally decreases air resistance to the air intake of the engine, there is a continuing interest in developing open air filter systems to improve engine performance beyond that otherwise possible with an enclosed air box. Embodiments provided herein disclose an air filter precleaner that includes a filter medium disposed between a base and a grating that are fastened over an opening into an interior of an air filter box.

Although embodiments of the present disclosure may be described and illustrated herein in terms of a cone air filter, it should be understood that embodiments of the present disclosure are not limited to the exact shape illustrated, but rather may include a wide variety of generally cylindrical shapes, generally circular, oval, round, curved, conical, or other closed perimeter shape, that provide a relatively large surface area in a given volume of the filter. Moreover, embodiments as described herein are not limited to use as internal combustion engine filters but may have applicability in other filtration systems in which a large volume of air needs to be treated.

FIG. 1 illustrates an exploded isometric view of an exemplary embodiment of an air filter precleaner 100 that is configured to be coupled with an aircharger air intake system 102 comprising an air filter box 104 configured to couple a cone-shaped air filter 108 to an air intake of an engine. The air filter box 104 comprises sidewalls 112, a floor 114, and a mount wall 116 that define an interior 110 of the air filter box 104. In general, the air filter box 104 is comprised of a rigid material that is sufficiently durable and temperature resistant to retain its configuration during installation and operation when coupled with the air intake of the engine.

The air filter 108 comprises a filter medium that provides an area to pass an airstream and entrap particulates and other contaminates flowing with the airstream. The filter medium may be comprised of paper, foam, cotton, spun fiberglass, or other known filter materials, woven or non-woven material, synthetic or natural, or any combination thereof. The filter medium may be pleated, or otherwise shaped, or contoured so as to increase a surface area for passing the airstream to be cleaned. The length of the filter medium in the circumferential direction may be longer than the circular circumference of the air filter 108 generally, such that the surface area of the filter medium is greater than the profile surface area of the air filter 108.

In some embodiments, the filter medium comprises 4 to 6 layers of cotton gauze sandwiched between two epoxy-coated aluminum wire screens. The cotton may be advantageously treated with a suitably formulated filter oil composition that causes tackiness throughout microscopic strands comprising the filter medium. The nature of the cotton allows high volumes of airflow, and when combined with the tackiness of the filter oil composition creates a powerful filtering medium which ensures a high degree of air filtration. Further details about components comprising the air filter 108, as well as details about the filter oil composition, are disclosed in U.S. patent application Ser. No. 14/181,678, entitled "Air Box With Integrated Filter Media," filed on Feb. 16, 2014, and U.S. patent application Ser. No. 14/701,163, entitled "Filter Oil Formulation," filed on Apr. 30, 2015, the entirety of each of which is incorporated herein by reference.

The air filter box 104 generally is of an open variety, rather than being an enclosed air box as is conventionally utilized with many vehicles. The sidewalls 112 and the floor 114 serve to protect the air filter 108 from road debris, as well as to isolate the air filter 108 from hoses and other components that may be present within an engine bay of the vehicle. It will be recognized by those skilled in the art that the open air filter box 104 improves airflow to the air filter 108, and thus decreases air resistance to the air intake of the engine, thereby improving engine performance beyond that otherwise possible with an enclosed air box. The air filter box 104 generally is configured to be mounted, or fastened, onto the engine by way of suitable fasteners. The fasteners generally may comprise any of suitably designed holes, brackets, molded shaped portions, protrusions, extensions, angled brackets, hardware fasteners, or other any similar device for supporting the air filter box 104 within the engine bay. It should be understood that the particular fasteners will vary according to the specific make and model of the vehicle with which the air filter box is to be used.

The mount wall 116 generally is configured to support the air filter 108 and provide an interface between the air filter 108 and the air intake of the engine. An opening 120 in the mount wall 116 is configured to receive an intake tube 124 that is configured to couple the air filter 108 with the air intake of the engine. In the embodiment illustrated in FIG. 1, the intake tube 124 is coupled with the air filter 108 by way of an adapter 126. Similarly, the intake tube 124 may be coupled to the air intake of the engine by way of an adapter 128. It is contemplated that any of various suitable hardware fasteners may be used in combination with the adapters 126, 128 to couple the air filter 108 and the intake tube 124 with the air intake of the engine. Further details regarding techniques for coupling the air filter 108 and the intake tube 124, as well as for coupling the air filter 108 with the mount wall 116 are disclosed in U.S. patent application Ser. No. 16/405,747, entitled "Aircharger Air Intake System and Method," filed on May 7, 2019, which is a continuation of, and claims the benefit of, U.S. patent application Ser. No. 15/794,909, filed on Oct. 26, 2017, which is a continuation of, and claims the benefit of, U.S. patent application Ser. No. 15/453,496, filed on Mar. 8, 2017, which claims the benefit of, and priority to, U.S. Provisional Application Ser. No. 62/305,391, filed on Mar. 8, 2016, the entirety of each of said applications being incorporated herein by reference and made a part of the present disclosure.

As further shown in FIG. 1, the air filter box 104 includes an opening 132 to the interior 110 of the air filter box 104. The opening 132 is bordered by a flat mating surface 136 upon which the air filter precleaner 100 may be installed, as described herein. It is contemplated that the opening 132 facilitates installing and removing the air filter 108 from the air filter box 104, as needed. For example, once the air filter 108 is dirty, the air filter may be removed from the air filter box 104 and a new, clean air filter 108 may be installed. In one embodiment, a method for removing the air filter 108 comprises removing the air filter precleaner 100 from the surface 136 to provide access to the interior 110 of the air filter box 104. Upon removing the air filter precleaner 100, the air filter 108 may be removed from the interior 110 by way of the opening 132.

Although the method for removing the air filter 108 generally facilitates replacing the air filter, when dirty, with a clean air filter, it is contemplated that the method for removing the air filter 108 is particularly advantageous for use with embodiments of the air filter 108 that are configured to be periodically cleaned and reused. For example, in some embodiments, the air filter 108 may be comprised of multiple layers of cotton gauze that are treated with a filter oil composition that enhances the filtration properties of the air filter. It is contemplated that a practitioner may clean the air filter 108 by first removing the air filter from the air filter box 104, as described above, and then applying a solvent to remove the filter oil from the cotton gauze comprising the air filter 108. The practitioner may clean the air filter 108 using a water hose to spray water so as to flush contaminants from the air filter. Further details about periodic cleaning of the air filter 108, as well as details about the filter oil composition, are disclosed in U.S. patent application Ser. No. 14/181,678, entitled "Air Box With Integrated Filter Media," filed on Feb. 16, 2014, and U.S. patent application Ser. No. 14/701, 163, entitled "Filter Oil Formulation," filed on Apr. 30, 2015, the entirety of each of which is incorporated herein by reference.

In the embodiment illustrated in FIG. 1, the air filter precleaner 100 includes a filter medium 140 disposed between a base 144 and a grating 148 that are configured to be fastened over the opening 132 of the air filter box 104. The filter medium 140 is configured for removing particulate matter from an airstream entering the air filter box 104 through the opening 132. In general, the filter medium 140 comprises a sheet of filter material having a shape and a size suitable for being supported between the base 144 and the grating 148. In some embodiments, the filter material 140 comprises a reticulated polyester urethane foam. The base 144 is a rigid member that includes a grate 152 surrounded by a border portion 156 that are configured to support the filter medium 140 in a sheet configuration, such that the airstream passes through the filter medium 140 before entering the interior 110 of the air filter box 104. The grating 148 is a rigid member comprising a screen portion 160 surrounded by a frame 164 that is configured to be fastened onto the air filter box 104. The grating includes a shape and a size suitable for fastening the filter medium 140 and the base 144 over the opening 132 of the air filter box 104. The screen portion 160 comprises a shaped lattice configured to allow the airstream to pass through the filter medium 140 before entering the air filter box 104. The filter medium 140, the base 144 and the grating 148 are discussed in greater detail in the following paragraphs.

FIGS. 4A, 4B and 4C illustrate respective top, side and bottom plan views of an exemplary embodiment of the grating 148 that is configured to be implemented in the air filter precleaner 100 shown in FIG. 1. The grating 148 is configured to couple the base 144 and the filter medium 140 onto the air filter box 104, as well as to provide protection to the filter medium 140 from other components within the engine bay. As mentioned above, the grating 148 generally is a rigid member comprising a screen portion 160 surround by a frame 164 that is configured to be fastened onto the air filter box 104. As shown in FIGS. 4, the screen portion 160 comprises a shaped lattice that is configured to allow an inflowing airstream to pass through the filter medium 140 before entering the interior 110 of the air filter box 104. In the illustrated embodiment of FIGS. 4, the screen portion 160 comprises a multiplicity of hexagon shaped openings 168 in the grating 148. It is contemplated, however, that the openings 168 may include any of various shapes that are suitable for tessellating the screen portion 160, without limitation.

The grating includes a shape and a size suitable for fastening the base 144 and the filter medium 140 over the opening 132 of the air filter box 104. As such, the frame 164 generally includes a perimeter shape that is substantially similar to the shape of the mating surface 136 of the air filter box 104. Further, the frame 164 includes a peripheral lip 172 that is configured to extend over an exterior of the filter medium 140 and the base 144. In some embodiments, the peripheral lip 172 is configured to contact the mating surface 136 surrounding the opening 132 of the air filter box 104. Further, a through-hole 176 is disposed in each of one or more corner portions 180 comprising the frame 164 are configured to facilitate fastening the grating 148 to the air filter box 104. To this end, each of the through-holes 176 is configured to allow passage of a hardware fastener, such as a screw or bolt, into a hole 184 disposed in the mating surface 136 of the air filter box 104. In some embodiments, the through-holes 176 may be counterbored to position a head portion of the hardware fastener below an exterior surface of the grating 148.

As best shown in FIG. 4C, each of the corner portions 180 includes an interior surface 188 that is configured to contact the border portion 156 of the base 144. The interior surfaces 188 are configured to ensure that a space suitable for the filter medium 140 is disposed between the base 144 and the screen portion 160 once the peripheral lip 172 is extended beyond the base 144 and placed into contact with the mating surface 136. Accordingly, the filter medium 140 includes corner cutouts 192 (see FIGS. 1 and 10A) that are configured to allow the filter medium 140 to be positioned adjacent to the interior surfaces 188. Preferably, the filter medium 140 includes a thickness 196 (see FIG. 10B) that is suitable for being disposed within the space between the screen portion 160 and the base 144 provided by the interior surfaces 188.

Figure 5C:
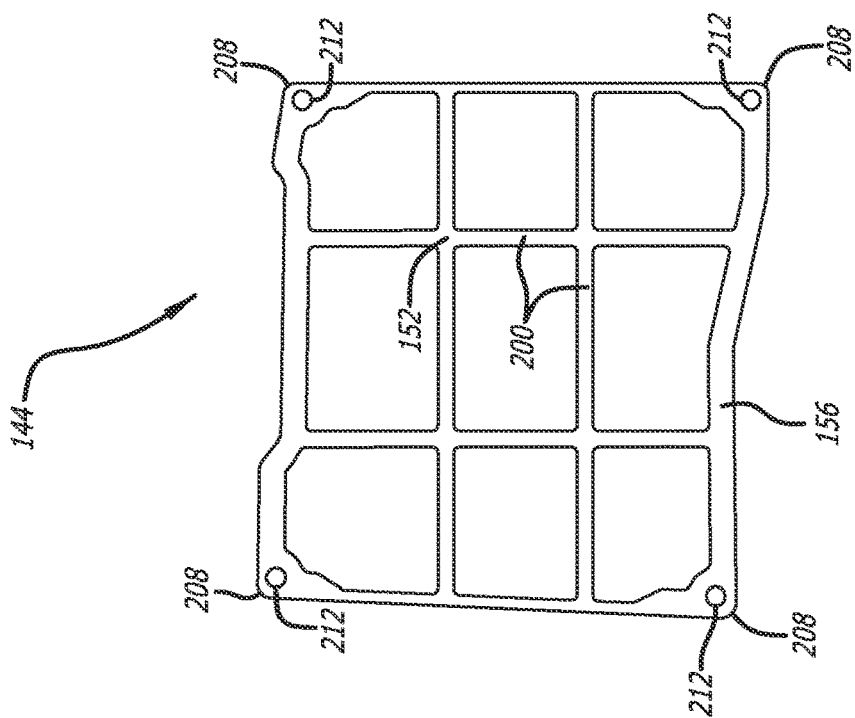
FIG. 5C illustrates a bottom plan view of the base shown in FIG. 5A.
Figure 5B:
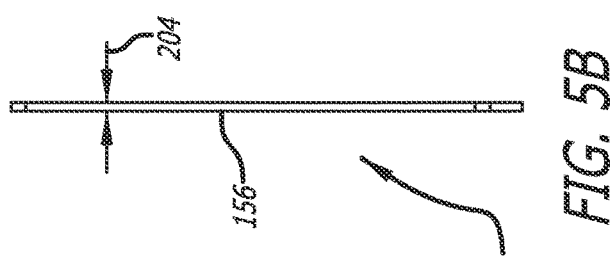
FIG. 5B illustrates a side plan view of the base shown in FIG. 5A.
Figure 5A:
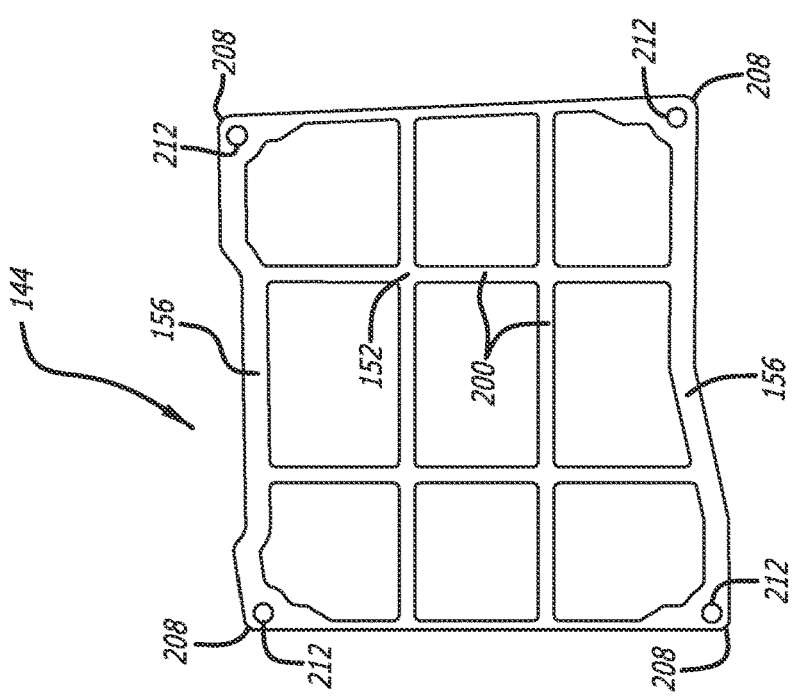
FIG. 5A illustrates a top plan view of an exemplary embodiment of a base comprising the air filter precleaner of FIG. 1.

FIGS. 5A, 5B and 5C illustrate respective top, side and bottom plan views of an exemplary embodiment of the base 144 that is configured to be implemented in the air filter precleaner 100 shown in FIG. 1. The base 144 generally is a rigid member comprising a grate 152 surrounded by a border portion 156 having a shape and a size suitable for being positioned within the peripheral lip 172 of the grating 148 and being fastened over the opening 132 of the air filter box 104. The grate 152 is configured to support the filter medium 140 in a flat, sheet configuration between the base 144 and the grating 148, such that an inflowing airstream passes through the filter medium 140 before entering the interior 110 of the air filter box 104. As best shown in FIGS. 5A and 5C, the grate 152 comprises a framework of perpendicular elongate members 200 that are arranged to support the filter medium 140 in the sheet configuration.

The border portion 156 is configured to be placed into direct contact with the mating surface 136 surrounding the opening 132 of the air filter box 104. As such, the border portion 156 includes a shape and a size suitable for being coupled between the grating 148 and the mating surface 136 while also extending over the opening 132. The border portion 156 includes a thickness 204 suitable for being disposed between the mating surface 136 and the interior surfaces 188 (see FIG. 4C) of the grating 148. As will be appreciated, placing the border portion 156 into the contact with the interior surfaces 188 ensures a space for the filter medium 140 is disposed between the base 144 and the grating 148.

Moreover, the border portion 156 includes corner portions 208 that are configured to align with the corner portions 180 of the grating 148. A through-hole 212 is disposed in each of the corner portions 208 and concentrically aligned with a corresponding through-hole 176 in each corner portion 180 of the grating 148. It is contemplated that each of the through-holes 212 is configured to allow passage of a hardware fastener, such as a screw or bolt, into a hole 184 disposed in the mating surface 136 of the air filter box 104. Thus, during fastening the air filter precleaner 100 onto the air filter box 104, the hardware fasteners may be inserted through each pair of aligned through-holes 176, 212 and then threadably engaged with the holes 184 disposed in the mating surface 136 of the air filter box 104.

Figure 2:
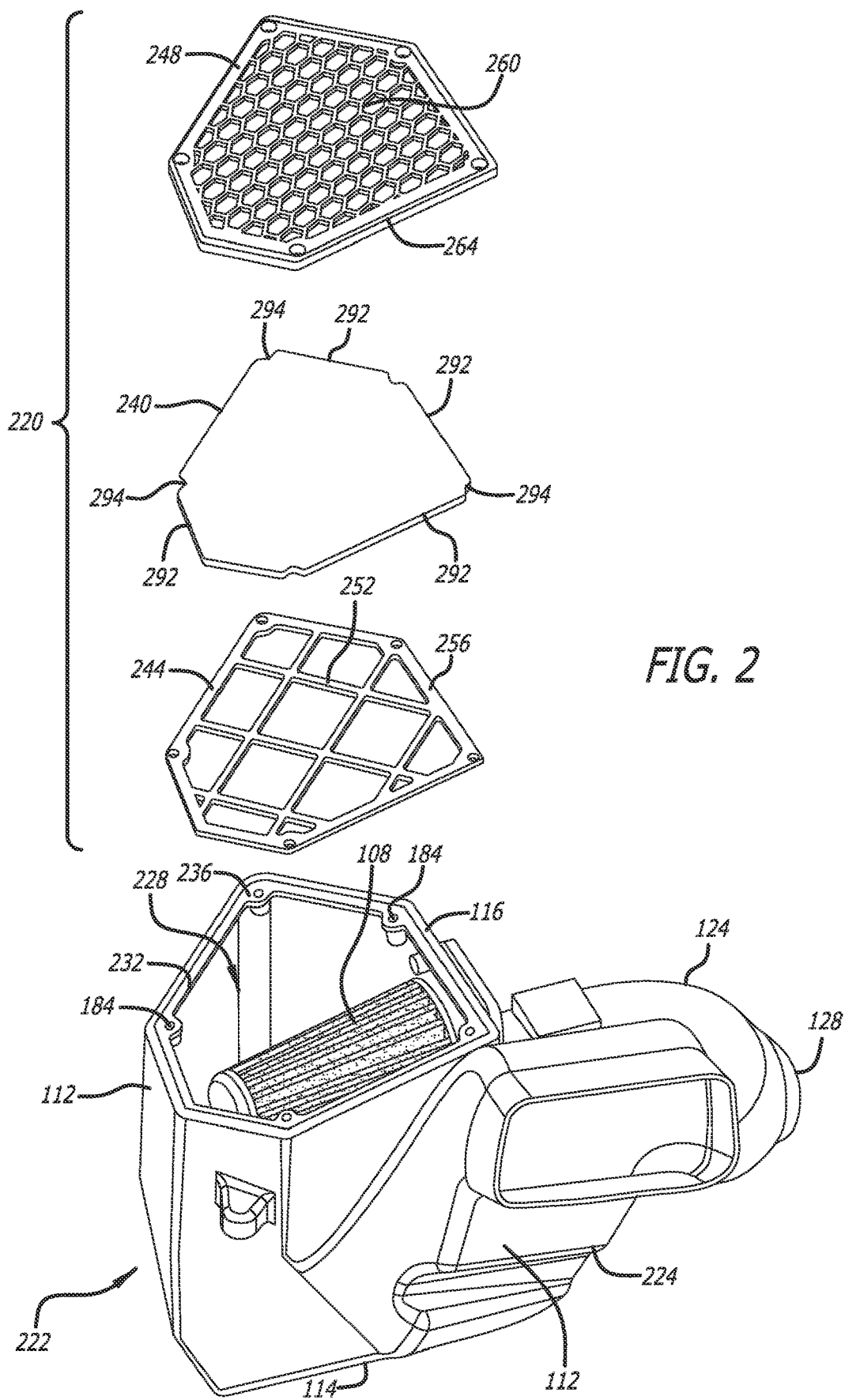
FIG. 2 illustrates an exploded isometric view of an exemplary embodiment of an air filter precleaner that is configured to be coupled with an exemplary embodiment of an aircharger air intake system configured for use with a turbo-diesel equipped engine.

FIG. 2 illustrates an exploded isometric view of an exemplary embodiment of an air filter precleaner 220 that is configured to be coupled with an aircharger air intake system 222 comprising an air filter box 224 configured to couple a cone-shaped air filter 108 to an air intake of an engine. The air filter box 224 is similar to the air filter box 104, shown in FIG. 1, with the exception that the air filter box 224 is configured for use with a turbo-diesel engine and thus has a different shape than the air filter box 104. Like the air filter box 104, the air filter box 224 comprises multiple sidewalls 112, a floor 114, and a mount wall 116 that define an interior 228 of the air filter box 224 that houses the air filter 108. The air filter box 224 generally supports the air filter 108 and provides an interface between the air filter 108 and the air intake of the engine by way of an intake tube 124 that may be coupled to the engine by way of an adapter 128. Details pertaining to the walls 112, 116 and the floor 114, as well as coupling the air filter 108 and the air intake of the engine, are discussed in connection with the air filter box 104 shown in FIG. 1. Further, like the air filter box 104, the air filter box 224 generally is comprised of a rigid material that is sufficiently durable and temperature resistant to retain its configuration during installation and operation when coupled with the air intake of the engine.

As shown in FIG. 2, the air filter box 224 includes an opening 232 to the interior 228 that is bordered by a flat mating surface 236 upon which the air filter precleaner 220 may be installed. As disclosed herein, the opening 232 facilitates installing and removing the air filter 108 from the interior 228 of the air filter box 224, as needed. For example, once the air filter 108 is dirty, the air filter may be removed from the air filter box 224, washed and dried, and then installed again into the air filter box 224. In some embodiments, the air filter 108 may be treated with a filter oil composition that enhances the filtration properties of the air filter 108.

In the embodiment illustrated in FIG. 2, the air filter precleaner 220 includes a filter medium 240 disposed between a base 244 and a grating 248 that are configured to be fastened over the opening 232 of the air filter box 224. The air filter precleaner 220 is similar to the air filter precleaner 100, shown in FIG. 1, with the exception that the air filter precleaner 220 has a shape and a size configured to cover the opening 232 of the air filter box 224. As such, the filter medium 240 is configured to remove particulate matter from an airstream entering the air filter box 224 through the opening 232. In some embodiments, the filter material 240 comprises a reticulated polyester urethane foam. The base 244 includes a grate 252 surrounded by a border portion 256 that are configured to support the filter medium 240 in a sheet configuration, such that the airstream passes through the filter medium 240 before entering the interior 228 of the air filter box 224. The grating 248 includes a screen portion 260 surrounded by a frame 264 that is configured to be fastened onto the air filter box 224. The screen portion 260 comprises a shaped lattice configured to allow an inflowing airstream to pass through the filter medium 240 before entering the air filter box 224.

FIGS. 6A through 6E illustrate an exemplary embodiment of the grating 248 that is configured to be implemented in the air filter precleaner 220 as shown in FIG. 2. The grating 248 is a rigid member configured to couple the base 244 and the filter medium 240 onto the air filter box 224, as well as to provide protection to the filter medium 240 from nearby components within the engine bay. As mentioned above, the grating 248 comprises a screen portion 260 surround by a frame 264 that is configured to be fastened onto the air filter box 224. As best shown in FIG. 6A, the screen portion 260 comprises a shaped lattice that is configured to direct an inflowing airstream through the filter medium 240 before entering the interior 228 of the air filter box 224. In the illustrated embodiment of FIGS. 6A through 6E, the screen portion 260 comprises a multiplicity of hexagon shaped openings 268 in the grating 248. It should be understood, however, that the openings 268 may include any of various shapes that are suitable for tessellating the screen portion 260, without limitation.

It will be recognized that the grating 248 is similar to the grating 148, shown in FIGS. 4A-4C, with the exception that the grating 148 includes a shape and a size suitable for fastening the base 244 and the filter medium 240 over the opening 232 of the air filter box 224. Accordingly, the frame 264 generally includes a perimeter shape that is substantially similar to the shape of the mating surface 236 of the air filter box 224. As best shown in FIGS. 6C and 6E, the frame 264 includes a peripheral lip 272 that is configured to extend over an exterior edge of the filter medium 240 and the base 244, such that the peripheral lip 272 contacts the mating surface 236 surrounding the opening 232. Further, a through-hole 276 disposed in each of one or more corner portions 280 comprising the frame 264 is configured to facilitate fastening the grating 248 onto the air filter box 224. To this end, each of the through-holes 276 is configured to allow passage of a hardware fastener, such as a screw or bolt, into a hole 184 disposed in the mating surface 236 of the air filter box 224. In the illustrated embodiment shown in FIG. 6D, the through-holes 276 include a counterbore 278 configured to position a head portion of the hardware fastener below an exterior surface of the grating 248.

As best shown in FIG. 6C, an interior ledge 288 is disposed adjacent to the peripheral lip 272 and is configured to contact the border portion 256 of the base 244. The interior ledge 288 is configured to ensure that a space suitable for the filter medium 240 is disposed between the base 244 and the screen portion 260 once the peripheral lip 272 contacts the mating surface 236. Accordingly, the filter medium 240 includes edges 292 and corner portions 294 (see FIG. 11A) that are configured to allow the filter medium 240 to be positioned adjacent to the interior ledge 288. Further, the filter medium 240 preferably includes a thickness 296 (see FIG. 11B) that is suitable for being disposed within the space surrounded by the screen portion 260, the base 244, and the interior ledge 288.

FIGS. 7A through 7C illustrate plan views of an exemplary embodiment of the base 244 that may be implemented in the air filter precleaner 200 shown in FIG. 2. The base 244 is similar to the base 144, shown in FIG. 1, with the exception that the base 244 has a shape and a size configured specifically to cover the opening 232 of the air filter box 224. The base 244 generally is a rigid member comprising a grate 252 surrounded by a border portion 256 having a shape and a size suitable for being positioned within the confines of the peripheral lip 272 of the grating 248, as described above. The grate 252 is configured to support the filter medium 240 in a flat, sheet configuration between the base 244 and the grating 248, such that an inflowing airstream passes through the filter medium 240 before entering through the opening 232 into the interior 228 of the air filter box 224. As best shown in FIGS. 7A and 7C, the grate 252 comprises a framework of perpendicular elongate members 300 that are arranged to support the filter medium 240 in the sheet configuration.

The border portion 256 is configured to be surrounded by the peripheral lip 272 of the grating 248 while being placed in direct contact with the mating surface 236 of the air filter box 224. As such, the border portion 256 includes a shape and a size suitable for being inserted within the confines of the peripheral lip 272. Further, the border portion 256 includes a thickness 304 suitable for being disposed between the mating surface 236 and the interior ledge 288 (see FIG. 6E) of the grating 248 while also allowing the peripheral lip 272 to contact the mating surface 236. As will be appreciated, placing the border portion 256 into the contact with the interior ledge 288 provides a space for the filter medium 240 is disposed between the base 244 and the screen portion 260 of the grating 248. As discussed above, the space between the base 244 and the screen portion 260 preferably accommodates the thickness 296 of the filter medium 240.

With continuing reference to FIGS. 7A through 7C, the border portion 256 includes corner portions 308 that are configured to align with the corner portions 280 of the grating 248. A through-hole 312 is disposed in each of the corner portions 308 and concentrically aligned with a corresponding through-hole 276 in each corner portion 280 of the grating 248. It is contemplated that each of the through-holes 312 is configured to allow passage of a hardware fastener, such as a screw or bolt, into a hole 184 disposed in the mating surface 236 of the air filter box 224. During fastening the air filter precleaner 200 onto the air filter box 224, therefore, the hardware fasteners may be inserted through each pair of aligned through-holes 276, 312 and then threadably engaged with the holes 184 disposed in the mating surface 236 of the air filter box 224.

Figure 3:
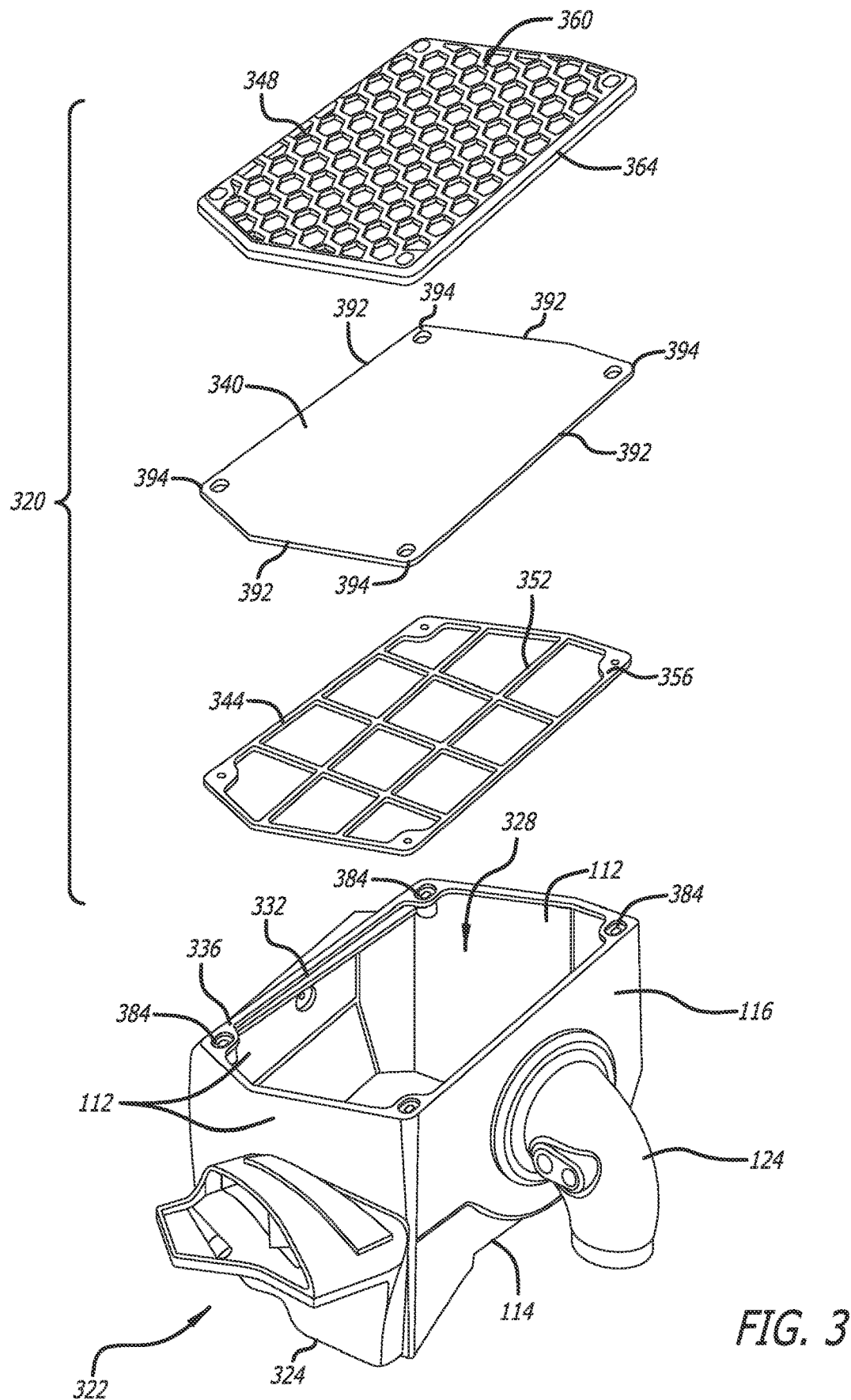
FIG. 3 illustrates an exploded isometric view of an exemplary embodiment of an air filter precleaner that is configured to be coupled with an exemplary embodiment of an aircharger air intake system configured for use with a turbo-equipped engine.

Turning now to FIG. 3, an exploded isometric view of an exemplary embodiment of an air filter precleaner 320 is illustrated. The air filter precleaner 320 is configured to be coupled with an aircharger air intake system 322 comprising an air filter box 324 configured to couple a cone-shaped air filter 108 (see FIGS. 1-2) to an air intake of an engine. The air filter box 324 is similar to the air filter box 104, shown in FIG. 1, with the exception that the air filter box 324 is configured for use with a turbo-equipped engine and thus has a different shape than the air filter box 104. Like the air filter box 104, the air filter box 324 comprises multiple sidewalls 112, a floor 114, and a mount wall 116 that define an interior 328 of the air filter box 324 that houses the air filter 108. The air filter box 324 generally supports the air filter 108 and provides an interface between the air filter 108 and the air intake of the engine by way of an intake tube 124 that may be coupled to the engine by way of one or more suitable adapters. Details pertaining to the walls 112, 116 and the floor 114, as well as coupling the air filter 108 and the air intake of the engine, are discussed in connection with the air filter box 104 shown in FIG. 1. Further, like the air filter box 104, the air filter box 324 generally is comprised of a rigid material that is sufficiently durable and temperature resistant to retain its configuration during installation and operation when coupled with the air intake of the engine.

With continuing reference to FIG. 3, the air filter precleaner 320 includes a filter medium 340 disposed between a base 344 and a grating 348 that are configured to be fastened onto a flat mating surface 336 bordering an opening 332 to the interior 328 of the air filter box 324. The air filter precleaner 320 is similar to the air filter precleaner 100, shown in FIG. 1, with the exception that the air filter precleaner 320 has a shape and a size configured to cover the opening 332 of the air filter box 324. The filter medium 340 is configured to remove particulate matter from an airstream entering the air filter box 324 through the opening 332. It is contemplated that, in some embodiments, the filter material 340 comprises a reticulated polyester urethane foam. The base 344 includes a grate 352 surrounded by a border portion 356 that are configured to support the filter medium 340 in a sheet configuration, such that the airstream passes through the filter medium 340 before entering the interior 328 of the air filter box 324. The grating 348 includes a screen portion 360 surrounded by a frame 364 that is configured to be fastened onto the air filter box 324. The screen portion 360 comprises a shaped lattice configured to direct an inflowing airstream to through the filter medium 340 before entering the air filter box 324.

FIGS. 8A through 8E illustrate an exemplary embodiment of the grating 348 that may be implemented in the air filter precleaner 320 of FIG. 3. The grating 348 is a rigid member configured to couple the base 344 and the filter medium 340 onto the air filter box 324, as well as to provide protection to the filter medium 340 from nearby components within the engine bay. As mentioned above, the grating 348 comprises a screen portion 360 surround by a frame 364 that is configured to be fastened onto the air filter box 324. As best shown in FIG. 8A, the screen portion 360 comprises a shaped lattice that is configured to direct the inflowing airstream through the filter medium 340 before entering the interior 328 of the air filter box 324. In the illustrated embodiment of FIGS. 8A through 8E, the screen portion 360 comprises a multiplicity of hexagon shaped openings 368 in the grating 348. It is contemplated, however, that the openings 368 may include any of various shapes that are suitable for tessellating the screen portion 360, without limitation.

As will be appreciated, the grating 348 is similar to the grating 148, shown in FIGS. 4A-4C, with the exception that the grating 348 includes a shape and a size suitable for fastening the base 344 and the filter medium 340 over the opening 332 of the air filter box 324. As such, the frame 364 includes a perimeter shape that is substantially similar to the shape of the mating surface 336 disposed around the opening 332 of the air filter box 324. As best shown in FIGS. 8C and 8E, the frame 364 includes a peripheral lip 372 that is configured to extend over an exterior edge of the filter medium 340 and the base 344, such that the peripheral lip 372 contacts the mating surface 336 once installed onto the air filter box 324. Further, a through-hole 376 disposed in each of one or more corner portions 380 comprising the frame 364 is configured to facilitate fastening the grating 348 onto the air filter box 324. To this end, each of the through-holes 376 is configured to allow passage of a hardware fastener, such as a screw or bolt, into a counter-bored hole 384 disposed in the mating surface 336 of the air filter box 324. In the illustrated embodiment shown in FIG. 8E, the through-holes 376 include a counterbore 378 configured to position a head portion of the hardware fastener below an exterior surface of the grating 348.

As shown in FIGS. 8C and 8E, a cylindrical ridge 388 defining each of the through-holes 376 extends below the screen portion 260 parallel to the peripheral lip 372. Each of the cylindrical ridges 388 is configured to extend through a through-hole 390 (see FIG. 12A) disposed in the filter medium 340 and contact the border portion 356 of the base 344. The cylindrical ridges 288 are configured to ensure that a space suitable for the filter medium 340 is disposed between the base 344 and the screen portion 360 once the peripheral lip 372 contacts the mating surface 336. Accordingly, the filter medium 340 includes edges 392 and corner portions 394 (see FIG. 12A) that are configured to allow the filter medium 340 to be positioned adjacent to the peripheral lip 272 and the cylindrical ridges 388. Further, the filter medium 340 preferably includes a thickness 396 (see FIG. 12B) that is suitable for being disposed within the space surrounded by the screen portion 360, the base 344, and the peripheral lip 372.

FIGS. 9A through 9D illustrate plan views of an exemplary embodiment of the base 344 that is suitable for being implemented in the air filter precleaner 320 shown in FIG. 3. The base 344 is similar to the base 144, shown in FIG. 1, with the exception that the base 344 has a shape and a size configured specifically to cover the opening 332 of the air filter box 324. The base 344 is a generally rigid member comprising a grate 352 surrounded by a border portion 356 having a shape and a size suitable for being positioned within the confines of the peripheral lip 372 of the grating 348, as described above. The grate 352 is configured to support the filter medium 340 in a flat, sheet configuration between the base 344 and the grating 348, such that the inflowing airstream passes through the filter medium 340 before entering air filter box 324. As shown in FIGS. 9A and 9C, the grate 352 comprises a framework of perpendicular elongate members 400 that are arranged to support the filter medium 340 in the sheet configuration. It will be appreciated that the elongate members 400 are substantially similar to the elongate members 152, 252 respectively illustrated in FIGS. 5A and 7A.

The border portion 356 is configured to be surrounded by the peripheral lip 372 of the grating 348 while being placed in direct contact with the mating surface 336 of the air filter box 324. To this end, the border portion 356 includes a shape and a size suitable for being inserted within the confines of the peripheral lip 372. Further, the border portion 356 includes a thickness 404 suitable for being disposed between the mating surface 336 and the cylindrical ridges 388 (see FIG. 8E) of the grating 348 while also allowing the peripheral lip 372 to contact the mating surface 336. As will be appreciated, placing the border portion 356 into the contact with the cylindrical ridges 388 provides a space for the filter medium 340 to be disposed between the base 344 and the screen portion 360 of the grating 348. As discussed herein, the space between the base 344 and the screen portion 360 preferably accommodates the thickness 396 (see FIG. 12B) of the filter medium 340.

With continuing reference to FIGS. 9A through 9C, the border portion 356 includes corner portions 408 that are configured to align with the corner portions 380 of the grating 348. A through-hole 412 is disposed in each of the corner portions 408 and configured to be concentrically aligned with a corresponding through-hole 376 in each corner portion 380 of the grating 348. It is contemplated that each of the through-holes 412 is configured to allow passage of a hardware fastener, such as a screw or bolt, into a counterbored hole 384 disposed in the mating surface 336 of the air filter box 324. Further, the border portion 356 includes a thicker portion 416 surrounding each of the through-holes 412, as shown in FIG. 9D. The thicker portions 416 are configured to extend into the counterbored holes 384 when the base 344 is placed into contact with the mating surface 336. As will be appreciated, extending the thicker portions 416 into the counterbored holes 384 serves to keep the through-holes 412 advantageously aligned with the counterbored holes 384 in the mating surface 336. During fastening the air filter precleaner 320 onto the air filter box 324, therefore, the hardware fasteners may be inserted through each pair of aligned through-holes 376, 412 and then threadably engaged with the counterbored holes 384 disposed in the mating surface 336 of the air filter box 324.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An air intake system for an engine, comprising:
   an air filter box having an opening to an interior of the air filter box;
   an air filter supported in the interior;
   an air intake tube coupled with the air filter and extended to an air intake of the engine;
   an air filter precleaner to be disposed over the opening;
   a base for supporting the air filter precleaner over the opening; and
   a grating for coupling the air filter precleaner and the base to the air filter box wherein the grating comprises a screen portion surrounded by a frame having corner portions configured to be fastened onto the air filter box wherein the frame comprises a perimeter shape that is substantially similar to the shape of a flat mating surface surrounding the opening, and wherein the frame includes a peripheral lip configured to extend over an exterior of the air filter precleaner and the base.

2. The air intake system of claim 1, wherein the air filter box is configured for use with a turbo-equipped engine.

3. The air intake system of claim 1, wherein the air filter box is configured for use with a turbo-diesel engine.

4. The air intake system of claim 1, wherein the base comprises a grate surrounded by a border portion that is configured to be coupled with the air filter box.

5. The air intake system of claim 4, wherein the air filter box includes a flat mating surface surrounding the opening.

6. The air intake system of claim 5, wherein the border portion is configured to be fastened onto the flat mating surface.

7. The air intake system of claim 6, wherein the border portion includes a shape and a size for being coupled with the mating surface.

8. The air intake system of claim 7, wherein the interior surfaces are configured to ensure a space for the air filter precleaner is disposed between the base and the grating.

9. The air intake system of claim 6, wherein the border portion includes a thickness for being disposed between the mating surface and interior surfaces comprising the grating.

10. The air intake system of claim 1, wherein the screen comprises a shaped lattice configured to protect the air filter precleaner while allowing an inflowing airstream to the pass into the interior.

11. The air intake system of claim 10, wherein the shaped lattice comprises a multiplicity of hexagon shaped openings.

12. The air intake system of claim 1, wherein the peripheral lip is configured to directly contact the flat mating surface.

13. The air intake system of claim 1, wherein the corner portions each includes an interior surface configured to contact a border portion comprising the base.

14. The air intake system of claim 13, wherein a through-hole disposed in each corner portion is configured to receive a hardware fastener into a hole disposed in a flat mating surface surrounding the opening.

15. The air intake system of claim 14, wherein the through-holes are counterbored to position a head portion of the hardware fasteners below an exterior surface of the grating.

16. The air intake system of claim 15, wherein the air filter precleaner includes corner cutouts configured to allow the interior surface of each corner portion to contact the border portion.

17. The air intake system of claim 16, wherein the air filter precleaner is configured to have a thickness that is suitable for being disposed between screen portion and the base.

* * * * *